(12) United States Patent
Mager

(10) Patent No.: US 7,365,769 B1
(45) Date of Patent: Apr. 29, 2008

(54) ACTIVATING A VEHICLE'S OWN BRAKE LIGHTS AND/OR BRAKES WHEN BRAKE LIGHTS ARE SENSED IN FRONT OF THE VEHICLE, INCLUDING RESPONSIVELY TO THE PROXIMITY OF, AND/OR RATE OF CLOSURE WITH, A FORWARD VEHICLE

(76) Inventor: Donald Mager, 2111 Delaware, St. Paul, MN (US) 55118

( * ) Notice: Subject to any disclaimer, the term of this patent is extended or adjusted under 35 U.S.C. 154(b) by 855 days.

(21) Appl. No.: 09/611,221

(22) Filed: Jul. 6, 2000

(51) Int. Cl.
*H04N 7/18* (2006.01)
(52) U.S. Cl. .................... 348/113; 348/118; 348/148; 340/467
(58) Field of Classification Search ............ 348/42–60, 348/118–120, 143, 148, 460–478
See application file for complete search history.

(56) References Cited

U.S. PATENT DOCUMENTS

| | | | | |
|---|---|---|---|---|
| 4,357,594 A | * | 11/1982 | Ehrlich et al. ............... | 340/467 |
| 5,166,681 A | * | 11/1992 | Bottesch et al. ............. | 340/933 |
| 6,268,804 B1 | * | 7/2001 | Janky et al. ................. | 340/903 |
| 6,396,397 B1 | * | 5/2002 | Bos et al. .................... | 340/461 |
| 6,411,204 B1 | * | 6/2002 | Bloomfield et al. ......... | 340/467 |
| 6,498,620 B2 | * | 12/2002 | Schofield et al. ........... | 348/148 |
| 6,587,573 B1 | * | 7/2003 | Stam et al. .................. | 382/104 |

* cited by examiner

*Primary Examiner*—Andy S Rao

(57) ABSTRACT

Any presence of brake light emissions of another vehicle to the forward of a subject vehicle is sensed in a color camera and microprocessor system that detects (i) red light(s) illuminations in excess of other colors, that are any of (ii) appropriately sized, (iii) appropriately located, (iv) simultaneously occurring, (v) spaced apart in separation, (vi) substantially horizontal, and/or (vii) of approximately of equal intensity, as would be appropriate to a single brake light, or to a pair of brake lights, as the case may be. The brake lights of the subject vehicle are preferably applied either during (i) the persistence of any detection of the brake light(s) of any other vehicle(s) to the forward, or (ii) normal application of the subject vehicle's own brakes. The forward-sensed rearward-propagated brake light signal is preferably delayed in propagation, limiting any propagation of minor perturbations in traffic. Optional application of the vehicle's own brakes may be conditioned upon (i) proximity to and/or rate of closure with a forward emission source as is preferably determined by angles, and/or upon (ii) rate of closure, speed or deceleration G force of the subject vehicle. The brake light signal, whether simple or sophisticated in either its development and/or presentation, beneficially alerts drivers to the rear of impending or actual slowing, thus deterring rear end collisions and promoting fuel economy.

23 Claims, 4 Drawing Sheets

ACTIVATING A VEHICLE'S OWN BRAKE LIGHTS AND/OR BRAKES WHEN BRAKE LIGHTS ARE SENSED IN FRONT OF THE VEHICLE, INCLUDING RESPONSIVELY TO THE PROXIMITY OF, AND/OR RATE OF CLOSURE WITH, A FORWARD VEHICLE

BACKGROUND OF THE INVENTION

1. Field of the Invention

The present invention generally concerns vehicular safety, including control of a vehicle's brakes and/or brake lights.

The present invention particularly concerns a (i) camera- and (ii) microprocessor-based system for sensing and interpreting brake lights to the forward of a subject vehicle.

The present invention further particularly concerns the criteria relevant to the sensing of (i) brake lights to the forward of a subject vehicle, and also (ii) the distance(s) of separation, and (iii) the rate(s) of change in this (these) distance(s) of separation.

The present invention still further particularly concerns the appropriate combination of sensed conditions, including such sensed conditions as may each have some degree of uncertainty, as will desirably occasion activation of the brake lights and/or brakes of the subject vehicle.

The present invention yet still further particularly concerns (i) the interplay between the differing circumstances as may occasion the activation of the brake lights and/or brakes of a subject vehicle, and (ii) the interaction between an advanced system of brake lights and/or brakes activation on this subject vehicle with all other vehicles on the highway, both equipped and un-equipped with the same or with similar systems, including during vehicle platooning.

2. Description of the Prior Art

2.1 Vehicular Rear End Collisions

As reported by True Indications Corporation, Granite Bay, Calif. at their web site <www.brake-alert.com>, tremendous progress has been made in the last few decades in vehicle safety.

Improvements in passive safety features such as seat belts, air bags, crush zones, visibility, and lighting have dramatically reduced the accident fatality rate in the U.S. For example, the fatality rate per hundred million vehicle miles traveled has fallen from 5.5 to 1.7 in the period from the mid 1960's to 1997.

However, each year motor vehicle crashes in the U.S. still account for a staggering 45,000 deaths, more than three million injuries, and $137 billion in financial losses. Accident data collected by the U.S. National Highway Transportation Safety Administration (NHTSA) show that about 88% of rear end collisions are caused by driver inattention and following too closely. See Knipling, R., et al., "Rear End Crashes: Problem Size Assessment and Statistical Description,"; NHTSA Technical Report, Springfield, Va., 1993.

Since rear-end collisions are based on human factors, any machine system that could compensate for, or alleviate, the consequences of driver inattentiveness and/or misjudgment in following too closely would be desirable. In this regard certain model year 2000 Mercedes Benz automobiles exhibit a special response when "panic braking" is sensed responsive to the driver's rapid plunge of the brake petal. Sensing such a condition, the Mercedes car will proceed to apply its own brakes faster than its driver ever could.

However, advance warning of collision and/or risk of collision is preferred, especially if sufficiently timely so as to couple the attention and judgment of the driver by alerting him or her to an incipient collision. In this regard collision avoidance and proximity detection systems for automobiles exist in the prior art. However, the infrequent exercise, potential for both false positives (collision predicted where none occurs), and false negatives (collision which in fact occurs is not predicted) of these systems make that these systems have not yet (circa 2000) been widely adopted. It would accordingly be desirable if some vehicle system serving to regularly reliably alert a driver to even the enhanced risk or possibility of collision could be developed.

If the driver could see, or otherwise learn, the response of such a system to "near misses", then the driver could come to appreciate, and respond to, the indications of the system—much as an airline pilot learns to respond to the "pull up; pull up" audio ground proximity warning, or the stall speed audio tone warning, of an airplane flight system.

2.2 A Severe Braking Indicator for Vehicles

In one less preferred variant of the brake light and/or brake activation system of the present invention, the system will be seen to optionally function so as to generate a braking signal that is flashing. It will be seen to be possible in the present invention that this optionally flashing indication can be ascribed to have some particular meaning. For example, a flashing brake light signal can mean, by way of example, that a brake light has been sensed to the fore while the vehicle in which the system of the present invention is installed is traveling more than some preset speed, for example more than forty miles per hour (40 m.p.h.). For example, a flashing brake light can mean that a obstacle, whether moving or not, has been detected within a preset range to the forward of the vehicle. For example, a flashing brake light can mean that the vehicle is experiencing a rate of closure with a vehicle or other potential obstacle to the fore in excess of some predetermined threshold rate.

Many other sensed conditions, and combinations of sensed conditions, will be seen to be suitable of combination with the primary sensed condition of the system and of the method of the present invention where the application of brake lights to the fore of a vehicle is sensed. However, for purposes of review of the prior art in the present section 2.2, it is sufficient simply to note that brake lights that are differentiated in accordance with certain sensed conditions already exist, and that these more sophisticated renditions of the standard brake light signal are apparently beneficial, or at least not deleterious, to safety.

An example of a previous production of a non-standard brake light signal is provided by True Indications Corporation, Granite Bay, Calif. The True Indications Corporation internet web site is: <www.brake-alert.com>. The Brake Alert™ (Brake Alert™ is a registered trademark of True Indications) safety device of True Indications is directed to helping reduce rear end collisions. On the premise—agreed to by the inventor of the present invention—that the best kind of safety device is one that helps prevent a collision from occurring, True Indications has developed an electronic control module that senses when a vehicle brakes severely. This device connects to the center third brake light. When a vehicle stops quickly, the control module senses the severe deceleration of the vehicle and begins to flash the third brake light at a fast rate. The flashing brake light informs the driver behind the decelerating vehicle that the leading vehicle is braking very hard (greater than 0.3 G or when the seat belt retractor locks). The third brake light still turns on steadily with normal braking, but flashes only when severe braking occurs. This early indication from the flashing brake light provides an early warning that the leading vehicle is doing some kind of emergency braking. This gives the vehicle following behind extra moments to take evasive action, e.g. brake immediately, change lanes, etc. A rear end collision is most likely caused by a vehicle stopping quickly. True Indications' Brake Alert control module senses when a vehicle is stopping quickly and immediately changes the third brake light's steady illumination to an eye-catching fast blinking light.

If the braking vehicle reduces its deceleration to less than 0.3 G, the third brake light will resume to a steady illumination. It is asserted that a driver behind a vehicle with Brake Alert system can get information about the vehicle's situation much sooner. A driver no longer has to "perceive" that the vehicle in front of him is stopping at a fast rate. It is further asserted that when Brake Alert system flashes the third brake light, the driver behind will know immediately that the vehicle in front is stopping quickly.

The manufacturer asserts that the Brake Alert system can be extremely helpful in rainy conditions when the streets are wet and a driver needs more stopping distance. A driver can also be informed earlier in foggy conditions that the vehicle in front of him is stopping quickly. It is asserted that the Brake Alert signal cuts through the fog and is visible at great distances. This early warning is especially important on highways where chain reaction pile ups can be avoided. As each drivers stops quickly, the driver behind gets immediate information from the flashing light. Since each driver is applying their brakes sooner, it effectively diffuses the situation of a possible multi-vehicle pile up.

The Brake Alert system is claimed to be even more effective when it is connected to the new bright LED (Light Emitting Diodes) third brake lights. These are usually located within rear spoilers or on top of mini-vans or sports utility vehicles. LEDs have fast turn on and turn off times which attract more attention to the severely braking vehicle. With either incandescent lamps or LEDs, the BRAKE ALERT warning system is directed to informing drivers behind a vehicle in which the system is installed that the vehicle is stopping quickly, potentially benefitting both vehicles. Accident statistics and numerical analysis strongly suggest that this type of warning system can be effective to help prevent rear end collisions.

SUMMARY OF THE INVENTION

The present invention contemplates a vehicular system, and method, that senses the incipient occurrence of brake lights to the front of a subject vehicle and, in response to sensed brake lights, effectively activates (i) the subject vehicle's own brake lights, thereby alerting drivers in vehicles to the rear of the possible future slowing and/or braking of the subject vehicle having the sensing and activating system, and/or (ii) the subject vehicle's own brakes.

As a consequence of sensing any application of brake lights to the forward of a subject vehicle, and activating the brake lights of the vehicle responsive to any sensed application of brake lights to the forward, brake lights are propagated from the forward of the subject vehicle to the rearward of the same vehicle, or a distance of one vehicle-length. An unbroken succession of vehicles so equipped will act to propagate a brake signal—preferably with such a vehicle-to-vehicle propagation delay as permits minor traffic perturbations to die out—from the forward of a first vehicle to the rearward of a last vehicle. Vehicles to the rear are thus timely warned of braking and possible slowing to the forward, and may timely respond by slowing or braking for safety and/or fuel economy.

The present invention has two principal aspects: (1) an effective, efficient, flexible, relatively economical and novel electronic sensor for detecting, qualifying and acting upon brake and tail light(s) emissions to the forward of a subject vehicle in which the system is installed; and (2) a sophisticated response protocol, considering many factors, for activating, optionally in several distinct manners, the subject vehicle's own brake lights and/or brakes.

The sophistication of the (2) activation protocol is based on the copious information developed by the (1) electronic sensor, which information can include each of (1a) the sensed incipient activation of brake lights in lane to the forward, (1b) the distance to any brake and/or tail lights to the forward, and (1c) the rate of closure to any brake and/or tail lights to the forward. The (2) activation protocol can be, and preferably is, sophisticated to produce (2a) different responses (2b) differently timed to (2c) different recipients including each of (2c1) the car (a machine) in which the system of the present invention is installed, (2c2) the car's driver (a human), and (2c3) the driver of the car behind the car in which the system of the present invention is installed (another human). The selection, timing and distribution of all the (2a) system response(s) are responsive to different sensed (1a)–(1c) conditions and/or combinations of conditions. The selection, timing and distribution of the (2a) system response(s) is under computer software control, and is thus quite flexible.

1. An Electronic Sensor

As regards its (1) electronic sensor aspect, the present invention in particular contemplates a cost effective combination of (i) a camera, or Charge Coupled Device (CCD), and (ii) a microprocessor. The CCD is mounted in a vehicle so as to detect a scene which may include (red-) colored brake and/or tail lights within a space to the forward of the vehicle, producing a digital signal output; the microprocessor receives the digital signal output of the CCD to interpret what the CCD has seen, and most particularly to interpret if brake lights and/or tail lights have been seen.

The combination electronic sensor serves to (1) to sensitively detect and accurately interpret the incipient application of brake lights to the forward of, and in the same traffic lane as is, a subject vehicle; (2) to detect the distance of separation to any of brake lights, tail lights and/or infrared exhaust emissions to the forward; and (3) to detect the rate(s) of change in this distance of separation. The sensor may also discern (4) certain traffic condition(s) (as revealed by brake lights and/or infrared exhaust emissions to the forward, For example, the sensor may find such a plethora of tail lights and sporadic brake lights as do indicate a congested traffic condition or traffic blockage. All detected conditions are relevant to later determinations as to the desirability of occasioning activation of the brake lights and/or brakes of the subject vehicle.

The combination electronic sensor may even (5) make decisions regarding the nature and differing natures of vehicular brake light and/or brake application(s) as are reasonably interpretable to have been occasioned by different circumstances. For example, the sensor may detect a continuous regularly periodically flashing brake light to the forward as being a brake light emergency flasher signal. This and all other decision-making is under control of a program executed by the microprocessor.

The processing of response(s) made resultant to the sensing is conducted in the same (ii) microprocessor as interprets the signals of the (i) CCD. Care must thus be taken to draw a distinction between the fact that the electronic sensor of the present invention is very good at recognizing and quantifying certain phenomena—to wit: brake lights and tail lights to the fore, and the distance and change in distance thereto—and the fact that the system using the sensed and recognized conditions is also quite sophisticated in what to do with the information—to wit: to apply the brake lights and/or brakes of the subject vehicle, including after delay and to varying duration or extent. The concept is simply this: despite being economical of construction, the preferred system of the present invention is quite powerful both to (i) recognize a lot of phenomena pertinent to the vehicular braking environment, and then, beyond that, to (ii) make complex use(s) of the recognized phenomena—as will be next discussed.

2. A Programmable Response

The primary use of the sensed and recognized phenomena—simplistically describable as "brake lights in lane to the forward"—is to (i) activate the vehicle's own brake lights in order to (ii) alert a driver of the vehicle to the immediate rear. In so functioning the advanced system of brake light activation system of the present invention permits interaction of the vehicle in which it is installed with other vehicles on the highway that are both equipped and un-equipped with the same or with similar systems, including during the platooning of multiple vehicles. The use of the sensed and recognized phenomena to (i) activate the vehicle's own brakes is only secondary; the primary use of the system of the present invention is brake light activation, As regards its aspect 2) response protocol, the system of the present invention may be simplistically considered to logically OR (i) a sensed condition of brake lights to the forward of, and in the same lane, as is the subject vehicle with (ii) the subject vehicle's own normal activation of its own brakes and/or brake lights, thus causing that the subject vehicle's own brakes and/or brake lights will be applied both (i) during actual braking and/or (ii) during the sensing of brake lights to the forward.

However, the preferred response protocol is more complex than a simple logical OR function. Consider first the less preferred, secondary, purpose of the system of the present invention: the activation of the vehicle's own brakes. It is not normally preferred that the system of the present invention should ever actuate the brakes of the vehicle in which it is installed. However, the system of the present invention can determine some situations where the composite sensed indications seem irrefutable that a collision may be imminent, and that activation of the subject vehicle's own brakes is entirely prudent. Upon this occurrence, which normally involves a condition continuously worsening (albeit over a short period of some few seconds), the system is preferably set to first initiate application of the brakes, and to continue to apply the brakes with increasing force if collision is imminent. This initiation of braking serves both (i) to gain valuable "lead time" if heavy braking is to occur, and (ii) to alert the driver who may have been negligent or asleep.

In this action the system of the present invention is remotely analogous to that expedited application of maximum braking in certain model year 2000 Mercedes Benz automobiles explained in section 2.1 of the BACKGROUND OF THE INVENTION section of this specification. The system of the present invention arguably works even better, however—especially for a sleeping or disabled driver. Sensing that something is seriously amiss by a composite detected conditions to the forward of the vehicle, the system of the present invention incipiently applies the brakes—which may be either a light or a heavy application depending upon interpreted conditions—faster than can the car's driver. The initiation of braking may serve to timely alert the driver to developing emergency conditions, or, if the system is somehow completely wrong, to motivate the driver to overcome and negate the braking response by, most commonly immediately, slightly moving the accelerator, and, ultimately if desired, disabling the optional braking capability of the system. The immediate goal of the system of the present invention in braking is not to stop the vehicle, it is to involve, or re-involve, the vehicle's driver in the braking of the vehicle.

Consider now the more preferred, primary, purpose of the system of the present invention: activation of the vehicle's own brake lights. The system of the present invention bestows an advantage to even but one single subject vehicle using the brake light sensing and activation attributes of the invention. This advantage to a system-equipped vehicle is clear: the subject vehicle timely cautions any vehicles to its rear of the possibly imminent slowing or braking of the subject vehicle. This is true even if actual braking of the subject vehicle is not as of yet transpiring, nor, indeed, even if actual braking never transpires before—due to a cessation of brake lights to the forward—the subject vehicle's own brake light becomes extinguished. Each vehicle with the system of the present invention thus timely alerts vehicles to its rear as to slowing ahead, possibly (i) deterring tailgating and (ii) avoiding being rear-ended in a collision should actual braking ensue.

Notably, the system of the present invention also benefits several vehicles in a row where each of which vehicles has the system. Should a platoon of cars traveling spaced-apart in a line each be equipped with the system of the present invention then an actual activation of brakes on and by a car to the forward is propagated down the line of cars until seen by the last car in line. The system of the present invention intentionally incorporates a small propagation delay to account for this situation, making that the cumulative propagation delay to any individual vehicle in line is proportional to the threat to, and remaining response time of, that vehicle to the slowing and/or obstruction to the front of the line.

3. How the Electronic Sensor System of the Present Invention Detects and Recognizes Many Phenomena Pertinent to Braking and Brake Light Control The electronic system of the present invention that is preferably based on a (i) camera and (ii) microprocessor both senses and interprets brake and tail lights to the forward of a subject vehicle. This system is so sensitive to detect brake and tail lights while beneficially realizing both low false negatives (i.e., real brake or tail lights seldom evade detection) and low false positives (lights other than real brake lights in forward locations properly of interest are seldom interpreted to be brake lights).

In order to decide what it is actually "seeing", the system of the present invention identifies, and acts upon, certain criteria each of which is relevant to finding that brake lights have been seen to the forward of a subject vehicle. These criteria include (i) red light(s) illuminations in excess of other colors, that are any of (ii) appropriately sized, (iii) appropriately located, (iv) simultaneously occurring, (v) spaced apart in separation, (vi) substantially horizontal, and/or (vii) of approximately of equal intensity, as would be appropriate to a pair of brake lights, or, more rarely, to a single brake light, as the case may be.

The system of the present invention optionally further identifies, and acts upon, certain criteria relevant to the determining (ii) distance(s) of separation, and (iii) the rate(s) of change in this (these) distance(s) of separation. These criteria include the (i) specific brightness, (ii) numbers, and (iii) geometric relationship, of detected (apparent) brake lights and tail lights.

The system of the present invention preferably employs a particular method of combining these sensed conditions—each of which conditions may, and likely unavoidably does, have some degree of uncertainty—so as to occasion the safe and reliable activation of the brake lights (and/or the brakes) of subject vehicle substantially without false negatives (i.e., failure to activate brake lights or brakes when properly called for) or false positives (i.e., unsound activation of brake lights and/or brakes) This preferred method is weighing: decisions as to what phenomena is being seen are made based by the accumulation of "points" contributed by each of a number of criteria to develop a "point total" on the basis of which point total a yes/no decision may reliably be based. Points may be negative. For example, a sensed point of red light that moves cyclically in a vertical axis may be train conductor waving a lantern, but is unlikely to be a tail light or a brake light.

The present invention recognizes, and accounts for, an interaction between (i) automated activation of brake lights and/or brakes activation on a subject vehicle and (ii) all other vehicles on the highway, both equipped and un-equipped with the same or with similar systems, including during vehicle platooning. Basically, the system of the present invention is not only compatible with existing vehicles and existing traffic, but is actually beneficial to vehicles other than the vehicle(s) in which the system is installed in that it promotes the smooth and safe flow of vehicular traffic.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

Figure 1:
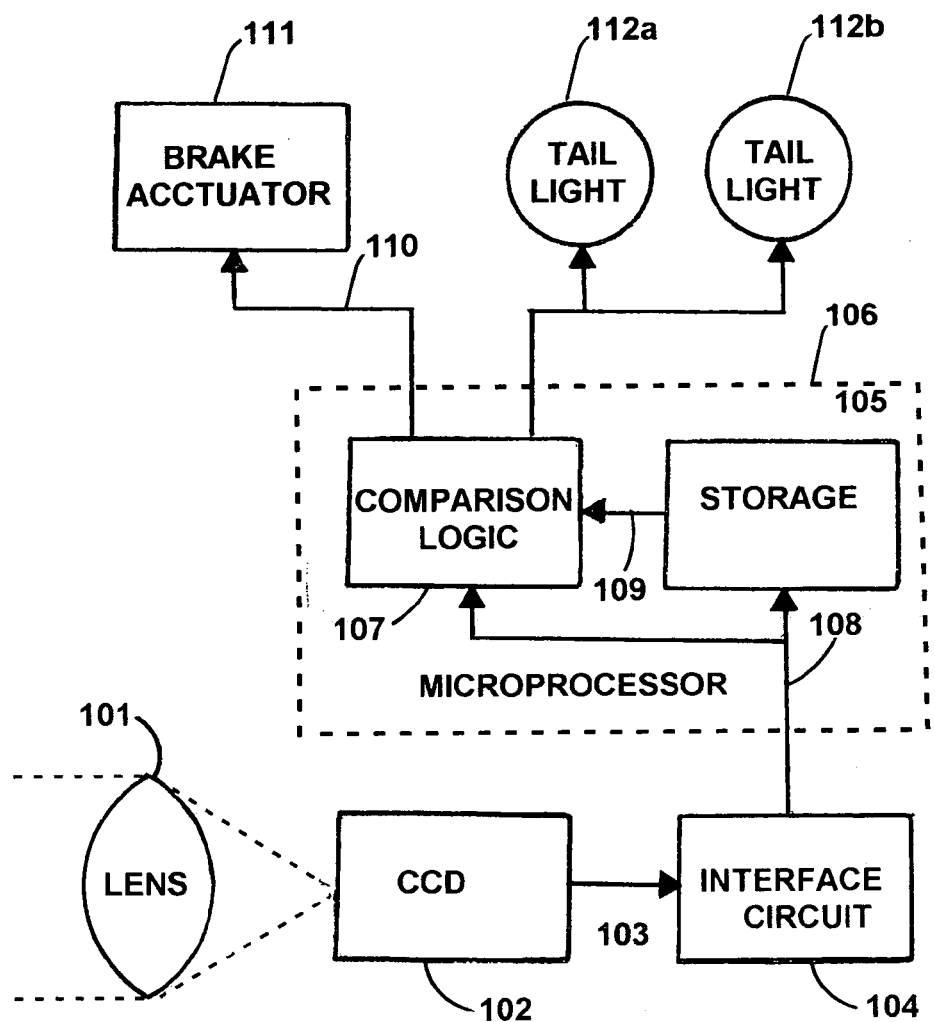
FIG. 1 is a schematic block diagram of a first and a second preferred, digital, embodiment of a vehicle brake light and or brake control system in accordance with the present invention.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Activation of Brake Lights of a Subject Vehicle in Response to Detection of Brake Lights to the Forward In one of its aspects the present invention is embodied in a method of activating the brake lights of a subject vehicle.

The method involves first sensing any application of the brakes of the subject vehicle, second sensing any presence of brake light emissions of another vehicle to the forward of the subject vehicle, and activating the brake lights of the subject vehicle during the persistence of either (i) an application of the brakes of the subject vehicle as is determined by the first sensing, or (ii) brake light emissions of another vehicle as is determined by the second sensing.

The second sensing preferably transpires by (i) imaging with a color camera a multi-color image to the forward of the subject vehicle, (ii) storing in a memory the multi-color image, and (iii) interpreting with a microprocessor a current multicolored image resulting from the imaging with a historical multicolored image resulting from the storing in order to recognize a particular change, to wit: the activation of one or more brake lights to the forward of the subject vehicle. ("To the forward" means directly ahead of the vehicle which, unless the vehicle is turning, means "in lane".)

By the comparison of the current image with the stored image the microprocessor will recognize any significant incipient increase in the color red that is accompanied by only insignificant changes in green and in blue colors. The red-color-changed pixels so incipiently detected are then validated to be any (i) of proper individual area(s), (ii) at a proper two locations (iii) properly spaced apart in separation and (iv) properly located in a substantially horizontal level plane so as to reasonably represent an activated pair of brake lights to the forward of the subject vehicle. The system of the present invention can detect a single brake light based on color and intensity and incipient occurrence but, in accordance with the preferred weighing procedures to be discussed, the system will be much less confident to act on a single brake light.

The interpreting may still further be of the angles that the red-color-changed pixels are to the subject vehicle. By consideration of angles it may be decided (under programmed control of the microprocessor) whether the detected "brake light(s)" (is) are in lane to the forward of the subject vehicle, or is (are) not in lane and is (are) instead to a side of the subject vehicle. Two spaced apart CCDs may be used. The differing angles to each CCD caused by even a single red light to the forward of the subject vehicle will provide the basis for an accurate trigonometric calculation of the distance to the red light.

By consideration of the rate of change in observed angles, and accompanying intensities, it may be decided (under programmed control in the microprocessor) how fast the subject vehicle is closing on the detected "brake light(s)".

The interpretation of the camera image, and the comparison of this current camera image with the stored image, with and in the microprocessor preferably transpires by a point accumulation process, There is preferably no absolute threshold test of some one criterion, nor even of several criteria, but rather a decision-making process that is based on point accumulation. Positive points, meaning that one or more brake lights of significance to the subject vehicle are likely being detected, are accumulated by assessing at least two, and preferably several, of the following factors: (1) a significant incipient increase in a red color, accompanied by only insignificant changes in green and in blue colors, (2) one or more individual areas of detected illumination increase as are appropriately sized to be an actual image of one or more real brake lights, (3) one or more individual areas of detected illumination increase as are appropriately located to be an actual image of one or more real brake lights, (4) two individual areas of detected illumination occurring at the same time as would be an actual image of the activation of a real pair of brake lights, (5) two individual areas of detected illumination increase as are appropriately spaced apart in separation to be an actual image of a real pair of brake lights, (6) two individual areas of detected illumination increase as are appropriately spaced apart in a substantially horizontal direction so as to be an actual image of a real pair of brake lights, and (7) two individual areas of detected illumination as are approximately of equal intensity as would be an actual image of a real pair of brake lights. If the most preferred point accumulation process is employed, then the additional factor of (8) an angle or angles at which one or more areas of illumination increase are detected—as would be appropriate to a location or locations of illumination increase on an actual image of one or more real brake lights to the forward of the subject vehicle—may be still further considered and interpreted. All these assessments (1)–(8) are quite readily accomplished under software control by processing the camera color image with the microprocessor.

2. A System for Activating the Brake Lights of a Subject Vehicle in Response to Detection of Brake Lights to the Forward Equivalently, the present invention may be considered to be embodied in a system for activating the brake lights of a subject vehicle. The system includes a first sensor producing a first signal upon any application of the brakes of the subject vehicle, a second sensor producing a second signal upon any presence of brake light emissions of another vehicle to the forward of the subject vehicle, and an activator of the brake lights of the subject vehicle during the persistence of either the first signal or the second signal.

The second sensor preferably includes (i) a color camera imaging a multi-color image to the forward of the subject vehicle, (ii) a memory storing the multi-color image, and (iii) a microprocessor interpreting a current multicolored image resulting from the imaging with a historical multicolored image resulting from the storing in order to recognize the activation of one or more brake lights to the forward of the subject vehicle. The (i) color camera is preferably a CCD, or a pair of CCDs that are preferably spaced apart by the substantial width of the vehicle. Particularly when multiple CCDs are used, the angles at which elements to the forward are imaged may be accurately determined. Accurate determination of these angles permits that both the distance, and rate of change in distance, to these image elements may likewise be accurately determined by trigonometric calculations.

Notably, however, the second sensor need not invariably be digital, and based on (i) a color camera, (ii) a memory, and (iii) a microprocessor of the like. The second sensor can instead be analog. It will then preferably comprise a red light optical signal sensor producing a red light signal responsive to intensity of red light to the forward of the subject vehicle, an ambient light sensor producing an ambient light signal response to intensity of ambient light to the forward of the subject vehicle, and a threshold difference detector, receiving the red light signal and the ambient light signal, for producing the second signal upon, and for the duration of, such times as a magnitude of the red light signal is greater than a predetermined ratio to a magnitude of the ambient light signal.

3. A Method and System for Activating the Brake Lights of a Subject Vehicle in a Sophisticated Manner In another of its major aspects the present invention may be considered to be embodied in a method for, and a system of, activating the brake lights of a subject vehicle in a sophisticated manner that typically supplies much more information, and intuitively interpretable information, than simply the standard "on-off" brake lights of a vehicle.

The preferred system includes (i) a first sensor producing a first signal upon any application of the brakes of the subject vehicle, (ii) a second sensor producing a second signal upon any presence of brake light emissions of another vehicle to the forward of the subject vehicle, and (iii) an activator of the brake lights of the subject vehicle during the persistence of either the first signal or the second signal.

The second sensor may be either a digital, or an analog, red light sensor producing a red light signal responsive to intensity of one or more red lights—interpretable as one or more brake lights—to the forward of the subject vehicle.

A detection signal produced by the second sensor may optionally be pulsed, as opposed to a continuous, during the persistence of the detection of brake lights. By this operation the system will produce intervals of flashing, as opposed to semi-continuous, brake lights in the subject vehicle.

When such pulsed signal is produced, the system further preferably includes some means—which can be a simple initial input to a computer—for setting the rate at which the pulsed second signal is produced. However, this means may optionally, and preferably, instead be (i) a proximity sensor for sensing an obstacle—including another vehicle producing the brake light emissions—to the forward of the subject vehicle, in combination with (ii) a rate-adjusting mechanism responsive to the proximity sensor for setting a higher rate when the proximity sensor indicates an obstacle relatively closer to the forward, and a lower rate when the proximity sensor indicates an obstacle relatively further to the forward, of the subject vehicle. The sensing of proximity, and of any rate of change in distance, may be, and normally is, derived from further processing of the camera image over time in the microprocessor under software control. The proximity, and rate of closure, sensing may alternatively be, however, based on entirely different vehicular sensor system, such as a radar system.

4. Delays in Activating the Brake Lights, and/or In Applying the Brakes, of the Subject Vehicle The system and method of the present invention preferably uses an intentional delay, much longer than any processing time, in the rearward propagation by a subject vehicle of sensed brake lights to the forward of the vehicle. This delay may, and preferably does, vary with vehicle speed, sensed and calculated apparent rate of closure, and still other factors. It is preferably some fraction of a second, depending on conditions. The delay prevents that every perturbation in the form of sensed brake lights activation to the front of a line of traffic should inevitably inexorably find its way to the rear. It prevents the subject vehicle in a line of traffic from acting like a "nervous Nelly". The termination of any rearward propagation of the brake light signal with any cessation of sensed conditions to the fore is immediate, with no delay.

The utility of the delay time, even if only in fractions of a second, is a sensed "pulsing" of the brakes of a vehicle to the fore will only be propagated in a line of vehicles equipped with the system of the present invention for a reasonable distance. The delay is cumulative for all vehicles in the line, making that a last vehicle will not see perturbation based on a short application of the brakes of a front vehicle.

With the delay, these conditions, and calculations, need not be, and are not, based upon a "snapshot" a single instant in time. Instead, conditions, notably including angle of separation in the sensed sources, must consistently indicate, even if for only half a second, that the situation is worsening, and entirely consistent with collision. Thus if the brakes of the subject vehicle are initiated then the system of the present invention will only found nothing to disabuse it of an initial opinion that conditions for collision are suspect, but has actually seen these conditions evolve consistently with a collision scenario for at least some fraction of a second.

The delay times, and time-based decision making processes of the present invention thus contribute greatly to avoidance of false negatives and false positives.

5. A First, Digital, Embodiment of a Vehicle Brake Light Sensing and Control System FIG. 1 is a schematic block diagram illustrating a first preferred embodiment of a vehicle brake light control system in accordance with the present invention. A lens 101 focuses an area of the road ahead of a vehicle onto color CCD (charged coupled device) camera chip 102. The chip 102 provides multi-color image information, via data channel 103, to interface circuit 104. The interface circuit 104 provides data for selected pixels (picture elements) via channel 108 to microprocessor system 106. The entirety of the field scanned by CCD array 102 might be more than the microprocessor system 106 can process on a timely basis, so interface circuit 104 permits the microprocessor system to identify pixels to be monitored, and obtain information for only those pixels.

Within the microprocessor system 106 a data storage area 105 retains previous information and provides such information, via channel 109, to comparison and logic area 107. This logic area 107 looks at current information received via channel 108, and the previous information, from some time shortly prior, received via channel 109, and compares them. Moreover, various colors are compared to consider only those pixels which demonstrate changes in the red, or other taillight-colored, information. For example, if a pixel shows an increase in red light intensity, but shows corresponding increases in green and blue light intensity, then such changes are ignored. However, if the pixel shows an increase in red light intensity, but no, or a much smaller, increase in green and blue light intensity, then the pixel represents a more or less predominantly red light, probably a taillight, and such information is considered in subsequent analysis.

Logic area 107 is programmed to consider each of the following. Are there red lights detected which were not viewed, or, in the event of night driving, were not viewed at equal intensity at an immediately past time? Are these detected new or brightened red lights reasonably separated from each other? Did the change for both appear at more or less the same instant in time? Are the red lights in a substantially horizontal plane at appropriate elevation to the subject vehicle? Are those same pairs of red lights increasing or decreasing in brightness? Is the separation of the red lights reasonable for brake lights. Are these red lights getting further apart or closer together, pixel-wise? If the current trends continue, will the estimated relative positions of the two vehicles collide, or will the vehicles pass off to one or the other side?

"Points" are granted for positive answers to the above questions. In particular, if a pair of red lights first appears or appears to brighten at more or less the same instant, and then grow in intensity, and then proceed to grow further apart pixel-wise (indicating a reducing distance to a vehicle ahead with brake lights on), then a high number of points is granted. If the growth in separation is modest, then this confirms in the apparent distance of physical separation between vehicles that the vehicle to the fore is likely braking. This is a very good reason to activate the subject vehicles own brake lights, but falls short of calling for initiating the brakes even if this optional feature is enabled. If, however, all answers are positive for brake lights and both intensity and angle of separation indicate both (i) proximity and (ii) high rate of closure then, no braking reaction forthcoming from the driver of the subject vehicle, threshold qualification to initiate the brakes may also be exceeded.

If a single red light is seen which is growing in intensity, this probably represents a vehicle with a single taillight, or a vehicle whose other taillight is obscured by another object. If a pair of lights is seen, but off to one side, and both lights seem to be heading towards one side or the other, this is probably a vehicle in the next lane of traffic, which represents little if any hazard. For such circumstances few if any points are assigned.

The number of points is an estimate of the degree of hazard represented by the relative positions and relative velocities of the subject vehicle and other vehicles on the road. If that number of points exceeds a certain threshold, then a braking signal 110 is applied to an automatic braking actuator 111 to slow the vehicle, with the amount of deceleration reflecting the extent by which the number of points exceeds the threshold. Moreover, a signal is applied to brake lights 112a and 112b. The brake lights of the subject vehicle are programmed to come on some fractions of a second after brake lights of a viewed vehicle are seen. This is done so that an instant chain reaction of like-equipped vehicles on a freeway does not cause a large number, e.g., a mile of cars, to all start to decelerate at once. Rather, the cars decelerate sequentially, with the number of decelerating cars growing with time, similar to the effect of human-controlled braking but with faster vehicle-to-vehicle sequencing.

6. A Second, Digital, Embodiment of a Vehicle Brake Light Sensing and Control System A second preferred embodiment of the digital system of the present invention is much like the first preferred embodiment of the system, and still appears as shown in the schematic block diagram of FIG. 1, save only that the system element 107, which is most typically a microprocessor operating under software program control, further performs a mathematical analysis of the lights which are viewed in an attempt to estimate (i) actual distances to viewed vehicles, and, further optionally, (ii) rate of change in these distances as represent closure or separation.

In estimating distance of separation, a empirical correlation is established between the brightness of a single light and its distance from the present vehicle. Moreover, if a pair of lights is detected then the distance to a vehicle is estimated based on trigonometric calculations, the lateral separation of the two brake lights of most vehicles being known, and roughly the same. A weighted average is established that is preferably based both on (i) specific brightness and, if available, (ii) angular separation between lights that are identified as being the either the dual brake lights or taillights of an imaged vehicle. Both the estimated most probable distance of separation, and the certainty in this estimation (i.e., standard deviation), may thus be calculated.

Furthermore, based on the estimated velocities and accelerations, the closing rate to a viewed vehicle may also be estimated. Based on (i) estimated distance of separation, (ii) certainty in this estimated distance, (iii) estimated rate of closure, (iv) certainty in this estimated rate, and (v) predetermined information regarding the average normal braking response of the subject vehicle, a required braking is calculated and applied.

The automatic brake signalling and/or braking control system of the present invention can operate both singly and by itself, or in conjunction with other sensors, e.g., a radar sensor. Other sensors might have "false positives" and "false negatives", as might also be possible under some circumstances with the present invention. However, it is likely that if points are granted reflecting the conditions of multiple sensors, and the braking actuation performed based on the combination of points, a more reliable system is likely.

Figure 2:
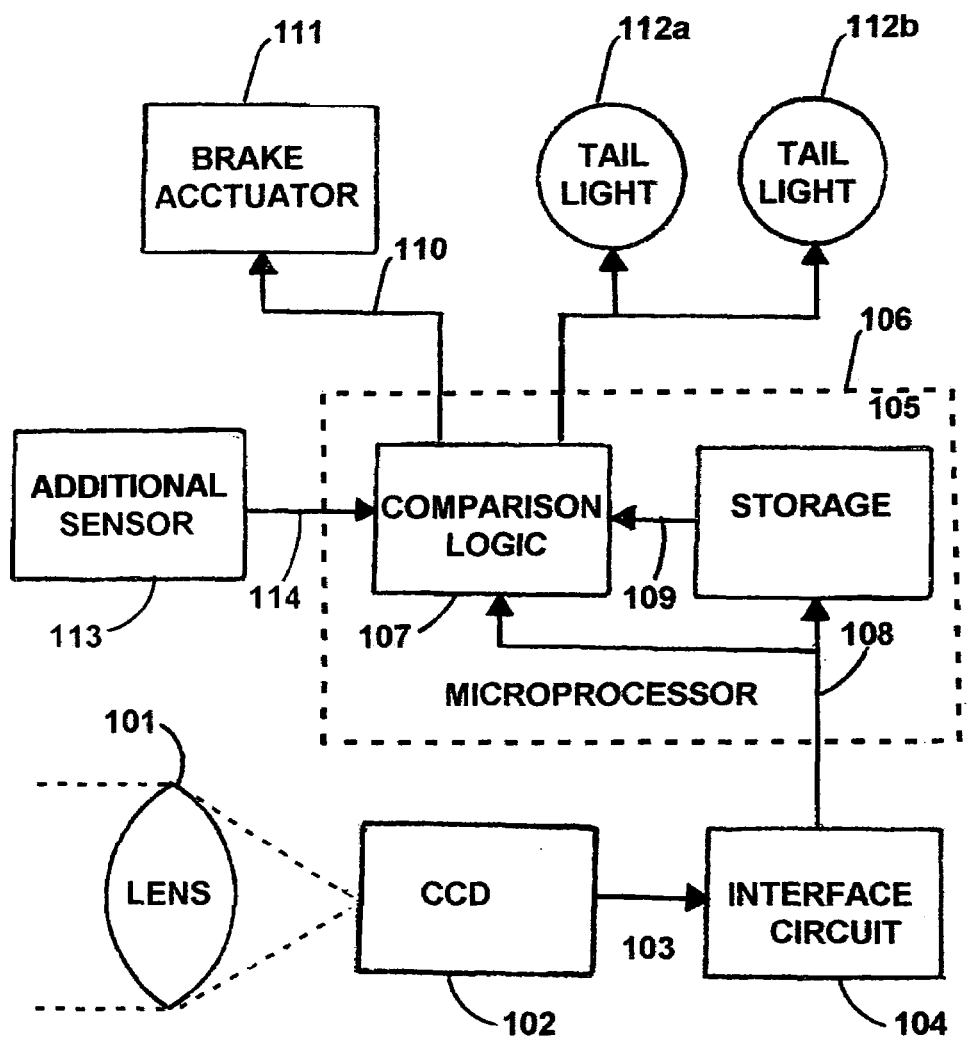
FIG. 2 is a schematic block diagram of variant third through sixth preferred, digital, embodiments of a vehicle brake light and/or brake control system in accordance with the present invention.

7. A Third, Digital, Embodiment of a Vehicle Brake Light Sensing and Control System Yet another, third, preferred embodiment of a braking system in accordance with the present invention, which system includes an input from another type of sensor other than only the optical or CCD sensor 102, is illustrated in FIG. 2. Like numbered items perform like functions as in previous FIG. 1.

A second sensor 113, for example a radar detector, is added. The signal, 114, from this detector is considered in logic 107 along with other information to arrive at a best estimate of the distance and rate of change of distance to a viewed and/or sensed vehicle.

8. A Fourth Embodiment of a Vehicle Brake Light Sensing and Control System

A fourth preferred embodiment may be block diagrammed (not shown) equivalently to any of the above preferred embodiments one through three, excepting only that the color CCD sensor (standard red-green-blue device) 102 shown in FIGS. 1 and 2 is replaced with a sensor wherein the sensed wavelengths (colors) are modified so that at least one of the wavelengths is well into the infrared. Such an infrared sensor is capable of sensing hot tailpipes, even during bad visibility conditions as are due to, most commonly, fog. Moreover, the logic of detection is modified so as to consider the intensity of warm or hot objects ahead, and the rate of change of such intensity. This information, possibly coupled with taillight data and/or radar proximity data, is used to form a more accurate estimate of what vehicles are ahead, and what the closure rate to these vehicles might be.

9. A Fifth Embodiment of a Vehicle Brake Light Sensing and Control System

A fifth preferred embodiment of the present invention is similar to any of the above preferred embodiments, except that instead of using just a single CCD optical sensor, two such sensors are used in a stereoscopic mode. Differences between what each of the two sensors detects are considered in developing such 3-dimensional information as provides both (i) estimated distance, and (ii) rates of change in estimated distance, to objects ahead of the subject vehicle. Because the separation of two separate sensors provides a wider baseline over which trigonometric calculations of distance may be made, the two separate sensor system delivers enhanced ranging accuracy. Such range information may be used singly, or in concert with any of the other types of information developed for any of the preferred embodiments.

10. A Sixth Embodiment of a Vehicle Brake Light Sensing and Control System

A sixth preferred embodiment of the present invention is similar to any of the above preferred embodiments, except that instead of, or in addition to, the brake activation and/or taillight activation outputs, a driver alert indication or warning is activated, this serving as either a visual and/or an audio alarm or indication. For example, at a first threshold of the aforesaid "points" as do indicate a likelihood of collision, an alarm warning, which is preferably audible, is sounded. This audio alarm might be of a constant intensity or pitch, or of an intensity or pitch varying with the estimated time to impact. At a second threshold, the vehicle's taillights are activated. At a third threshold, the vehicle's brakes are activated. These various thresholds may be identical or different in magnitude.

11. A Seventh, Hybrid, Embodiment of a Digital Vehicle Brake Light Sensing and Control System with (i) Analog Sensing and (ii) Digital Processing Yet another, seventh, hybrid (i) analog sensing and (ii) digital processing, embodiment of a braking system in accordance with the present invention is illustrated in FIG. 3.

Figure 3:
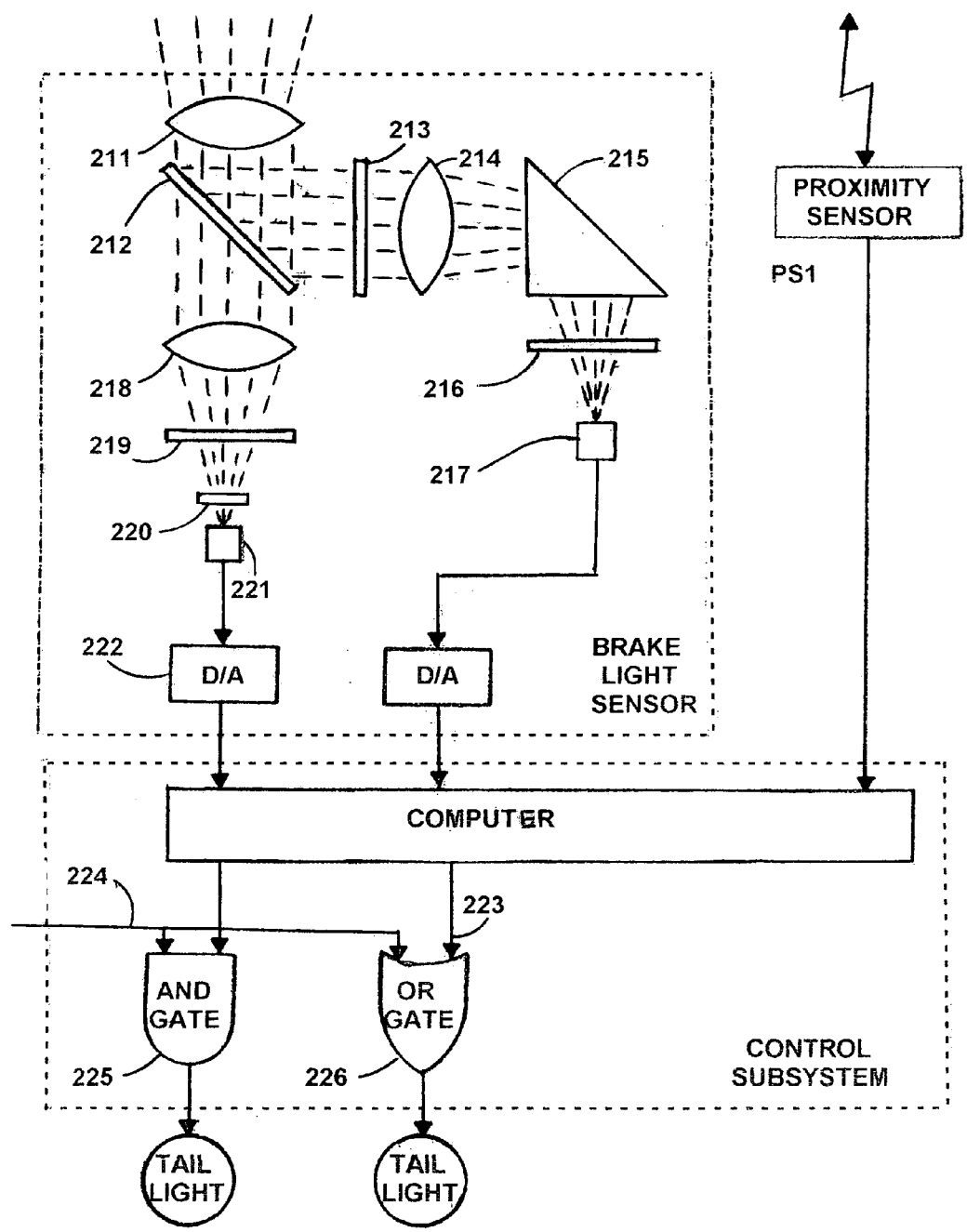
FIG. 3 is a diagrammatic perspective view showing a less preferred, mixed analog and digital, seventh embodiment of a system for, in accordance with the present invention, activating a vehicle's own brake lights when brake lights are sensed in front of the vehicle

The embodiment of the brake light sensing and activating system 20 of the present invention shown in FIG. 3 is less preferred because of, inter alia, its optical components and crude, non-field of view, sensors. The system 20 is partitioned into a sensing subsystem 21—the OTHER VEHICLE'S BRAKE LIGHT'S SENSOR—and a brake light signal control subsystem 22.

The sensing subsystem 21 is preferably optical. A lens 211 has a narrowly diverging field of view aligned directly to the forward of the subject vehicle. The focal length of the lens 211 is typically 80 mm, meaning that the field of view has spread to a circle of diameter approximately five feet at a distance of ten feet (10'). This field of view of the lens 211 subtends a solid angle that will capture left, right and center, brake lights of a vast majority, estimated to be 99%+, of motor vehicles meeting U.S. Department of Transportation (DoT) standards circa 2000 when these vehicles are as close as one typical car length, or fifteen feet (15') to the fore of the subject vehicle. As vehicles to the fore of the subject vehicle become more distantly separated from the subject vehicle, the diverging beam of the lens 211—which beam essentially determines the solid angle in which brake light illuminations (or other illuminations interpretable as brake light illuminations)—will gradually start to take in a wider field of view that includes, most importantly, the rear ends of vehicles in adjacent lanes, both left and right, on a multi-lane highway and, ultimately in the infinitely far distance, an infinitely side field.

The presence of distant vehicles, and their illuminated brake lights, within the field of view of the sensing system 21 and its lens 211 is accounted, as will shortly be seen, by an optical signal sensitivity control which is, in the preferred embodiment, dynamic. However, for the moment, it should be understood that the lens 21 preferably promotes several things. First, the lens may not be of radially equal transmissivity, with the efficiency of optical coupling being greatest to the direct fore while signals to the periphery of the lens are more strongly attenuated by expedient so simple as tinting the lens 211 in this region. Second, the lens may be masked, particularly to the sides as does avoid the coupling of light sources at both (i) extreme side angles, such as a car's brake lights some two lengths ahead but two lanes over, and (ii) to the top, such as a traffic light. The lens 211 can be chosen, masked and/or adjusted to the particular vehicle to which it is fitted, normally upon manufacture. However, even a ubiquitous universal lens 111 will, with other aspects of the present invention next explained, suffice to distinguish the emissions of the brake lights of virtually all vehicles at some 1–6 car lengths (15–90') ahead with good rejection of spurious signals.

As might be expected, the untoward light emission to which the system is most sensitive are bright brake light emissions, particularly of a closest such brake light, from a vehicle in an adjacent lane approximately 2–4 car lengths (30–60') ahead. Although it is perhaps not optimal that the system of the present invention should activate the subject vehicle's brake lights upon such an occurrence, it is not particularly troublesome. Consider that if traffic in an adjacent lane is slowing—as indicated by the (sensed) illuminated brake lights—but traffic in the lane of the subject vehicle is proceeding apace, several things can happen.n First, a vehicle from the slowing lane can pull ahead of the subject vehicle, which makes it not a bad thing that an alert was given, Second, the subject vehicle can "whiz on by", which makes that the alert was short and likely inconsequential.

Continuing in FIG. 1, the light from the scene to the fore of the subject vehicle as collimated by lens 211 is falls upon a selectively reflective/selectively transmissive element, the red reflective mirror 212. The mirror 212 is designated "red reflective", and serves to selectively reflect red light, only so long as the brake light emissions are red, as they presently (circa 2000) are. Should brake light emissions change to another color, for example blue as has been proposed, then a practitioner of the present invention will realize that the color selectivity presented by the mirror 212 must change accordingly.

The reflected red light is transmitted through further first interference filter 213, focusing lens 214, corner reflector 215 and second interference filter 216 to first, red-sensitive, photodiode 217. The interference filters 213, 216 preferably have a wavelength $\lambda=673$ nm (i.e., red). The focal length of the lens 214 is preferably 50 mm.

The remaining, scene ambient, light (substantially devoid of red light) is passed through a focusing lens 218, iris aperture 219, and slit 220 onto a second, broad spectral sensitivity, photodiode 221. The lens 218 is preferably of focal length 80 mm. The width of the slit 220 is preferably 20 µm.

The photodiode 217 produces a signal the magnitude of which is indicative of the intensity of red light in that particular field of view to the fore of the subject vehicle which field of view is established by the lens 211 and associated components. Meanwhile, the photodiode 221 produces a signal the magnitude of which is indicative of the overall intensity of light in the same field of view.

The outputs of the two photodiodes 217, 221 can be subtracted in an analog operational amplifier (not shown), and compared to a reference voltage signal that may be adjustable (such as with a potentiometer), the signal output of the operational amplifier being used directly (and/or further shaped and amplified, as required) to energize the brake light(s) of the subject vehicle. Such a simple conclusion (not shown) to the circuit of the present invention is eminently satisfactory in most applications, and should not be considered inferior simply because a more versatile, computer-based, embodiment is shown in this specification. The embodiment shown enables implementation of all the many permutations and combinations of uses and combined uses to which the sensed condition of brake lights to the forward may be put. Additionally, both a computer and vehicle-wide (i) sensor and (ii) control busses will likely be part of the vehicle of the future, making that sensors will be "dumb", as is the brake light sensor or the present invention so far explained, and the vehicular activity (herein the activation of brake light(s)) to be conditioned upon such dumb sensors will determined by the programmed operations of a computer.

Figure 4:
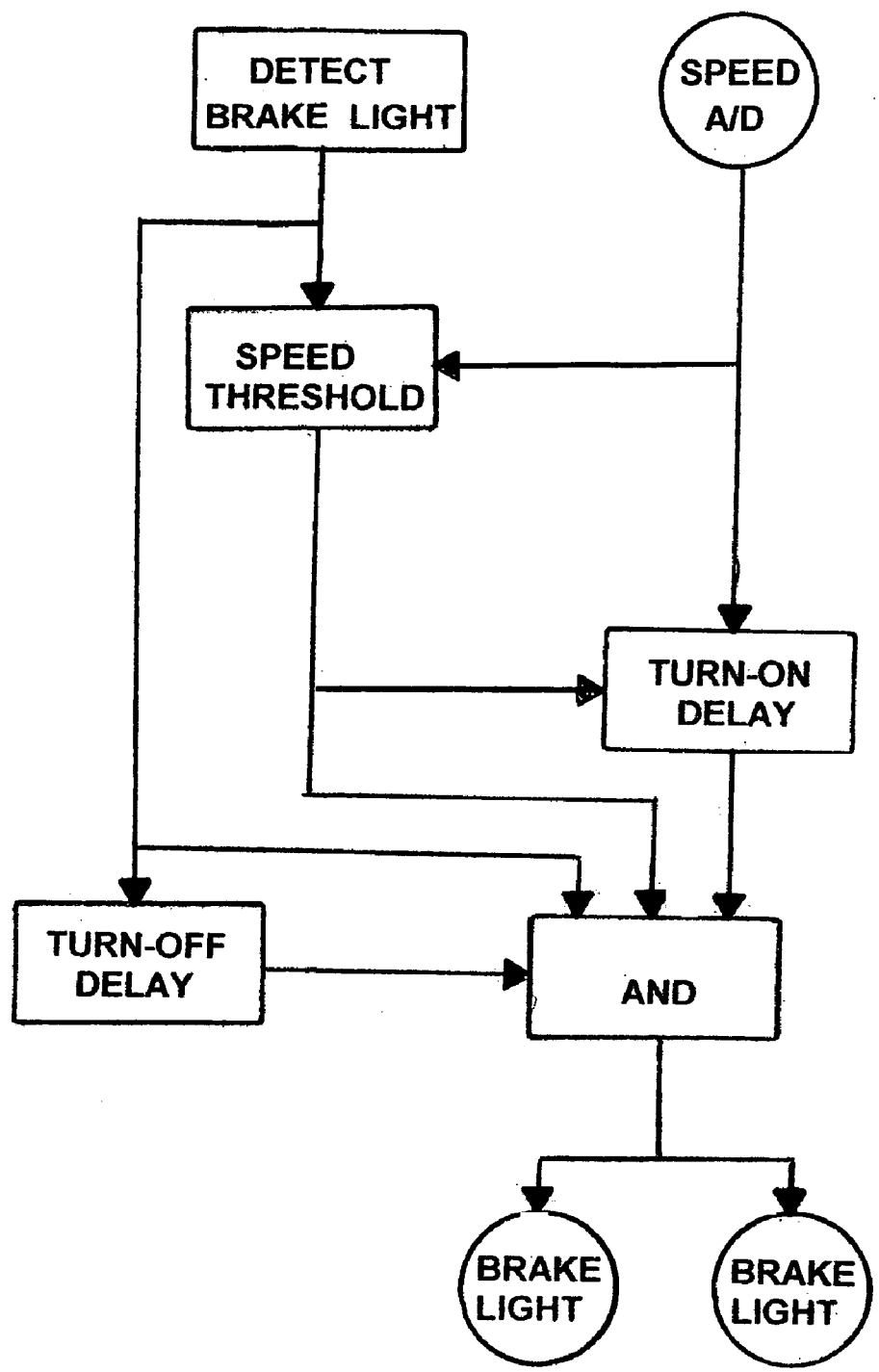
FIG. 4 is a flow chart of an exemplary portion of exemplary software operative in a microprocessor within any embodiment of the system of the present invention, which system serves to activate a vehicle's own brake lights and/or brakes when brake lights are sensed to the forward of the vehicle.

When a computer 221 is used, the outputs from the photodiodes 217, 221 are respectively converted to digital signals in analog to digital (A/D) converters 222, 223. The computer 221 executes the software program shown in the flow chart of FIG. 4. An optional input may be received from proximity sensor PS1, shown in phantom line for not being an essential part of most embodiments of the present invention. The computer produces two output control signals 222 and 223, each of which is respectively combined in AND gate 225 and in OR gate 226 with a vehicular signal 224 indicating that the braking is engaged (such signal as is commonly developed by a switch behind the brake pedal). Note that although the indicated source of the BRAKING ENGAGED signal 224 is not within the computer 221, a practitioner of the vehicular electronic control system arts may recognize that the condition represented by this signal may indeed be within the vehicle's computer 221, and that the computer may internally perform, by software, the functions of the gates 225, 226. It will therefore be generally understood that the CONTROL SUBSYSTEM 22 hardware shown in FIG. 3, and the software flow chart shown in FIG. 4, are but examples only, and that the detail usage of the signals developed in the diodes 217, 221 to control the brake lights of the subject vehicle is a matter of design choice, many different solutions being well within the ability of a practitioner of the vehicular electronic control system arts.

12. Many Variations and Adaptations are Within the Scope of the Present Invention Once the core of the present invention to detect brake light signals to the forward of a vehicle, and, so detecting, to propagate these brake light signals to the rear of the vehicle, is recognized, then many variations and adaptations are within the scope of the present invention.

12.1 Variations and Adaptations in the Location(s) of the Brake Light Signals Presented The present invention contemplates presenting the rearward propagated, or composite, brake light signal in special, secondary and/or selected rear lights as well as the standard brake lights of the vehicle. The rearward propagated, or composite, brake light signal may be reserved for the "third" brake light that is centrally located. Alternatively, either signal may be used to activate a special light or lights.

The rearward propagated brake light signal may be routed to, and used to activate, some brake light(s), for example the central brake light, while the composite signal is routed to, and used to activate, a pair of left and right rear body or fender brake lights. Consider the nature of this display: the center brake light may go off, indicating that congested traffic ahead may be commencing to move, even as the vehicle's own brakes are still applied. By providing greater information to each successive driver in the rear, this could be considered a means of facilitating driver response to stop-and-go traffic, potentially permitting lines of stopped traffic to "start up quicker".

12.2 Variations and Adaptations in the Color(s) of the Brake Light Signals Presented The present invention is clearly adaptable to sense brake lights, or other braking/slowing light indications—including those as may be developed by the present invention—that are colored other than red, for example blue.

12.3 Variations and Adaptations in the Time Sequence(s) of the Brake Light Signals Presented It has already been explained that the rearward propagated signal resulting from the sensing of brake light illumination to the forward (continuous or intermittent or pulsed) may itself be pulsed.

The present invention is clearly adaptable that this signal should be of a certain finite duration, making that if the vehicle in which the system of the present invention is installed does not itself commence to brake within some time interval, then the rearward propagated signal is terminated, again for some predetermined time interval. This could account for being parked behind a car or other source of continuous red light, or following a person who rode his or her brakes, constantly displaying brake lights.

The rearward-propagated brake light signal can optionally be flashed, or pulsed, —as opposed to being presented steadily—only at such times, and while, the vehicle in which the system of the present invention is installed is traveling more than a predetermined speed, normally forty per hour (40 m.p.h.).

The rearward-propagated brake light signal can be flashed, or pulsed, only at such times, and while, the vehicle in which the system of the present invention further detects, such as by a standard proximity sensor of the type commonly used in security lights, an obstacle, whether moving or not, within a predetermined range to the forward of the vehicle.

The rearward-propagated brake light signal can be flashed, or pulsed, only at such times, and while, the vehicle in which the system of the present invention is installed is experiencing a rate of closure with a vehicle or other potential obstacle to the fore in excess of some predetermined rate, or in excess of some predetermined rates that are a function of the vehicle's present speed.

The rearward-propagated brake light signal can be flashed, or pulsed, only at such times, and while, the vehicle in which the system of the present invention is installed is experiencing a deceleration rate, regardless of cause, in excess of a predetermined rate, normally 0.3 the force of gravity, or 0.3 G.

12.4 Variations and Adaptations in Qualifying any Presentation of a Rearward Propagated Brake Light Signal The present invention is clearly adaptable so that a brake light signal sensed to the forward will not be propagated in any fashion to the rearward if the vehicle speed is below a certain limit, nominally ten miles per hour (10 m.p.h.).

As mentioned in section 8.3 above, rearward propagation of a brake light signal sensed to the forward might be suspended if such presumed signals are continuously, or too often, sensed—which might indicate a problem in the forward vehicle.

12.5 Variations and Adaptations Using Radar, Sonar and the Like Proximity Sensors Clearly many aspects of the sophisticated determinations regarding brake light and/or braking activation made by the system of the present invention are made enabled by the quality, and the informational content, of the sensed conditions. Namely, each of the nature of the obstruction to the front (a vehicle), its distance, and the rate of closure are determined with both accuracy and certainty (with low false negatives and false positives). More generalized proximity sensors and sensing systems have yet (circa 2000) to exhibit this quality of performance.

However, it is clear that the basic concept of propagating a braking signal rearward can involve the sensing of many different conditions. These conditions include (i) a downward spasm in the speed of an "obstacle" (a moving vehicle) to the fore is sensed (relative to ones own vehicle speed), and/or (ii) a rapid rate of closure on an obstacle to the fore is sensed. Situation (ii) differs from situation (i) only if ones own vehicle is accelerating relative to the obstacle to the forward, which obstacle if a vehicle may be maintaining a steady speed. In any case, and although many aspects of the present invention are lost or transformed, it is possible to adopt certain characteristics of the present invention to an alternative distance and/or proximity sensor technology.

12.6 Further Variations in The Appearance(s) of the Actuated Brake Lights

Although not presently preferred, it is also contemplated that, as the public gains familiarity with such sophisticated application of brake lights as is taught be the present invention, the brake lights themselves may be visually distinguished. They may be so distinguished by (i) using a different color, or by (ii) being flashed in coded sequences, and/or progressively brightened or dimmed, in certain attention-getting, effective, and sophisticated but intuitive ways that impart useful information to drivers in vehicles behind the subject vehicle. A vehicle in which the system of the present invention is installed thus continues to be simultaneously safer for its own occupants and safer for following vehicles.

In accordance with the preceding explanation, variations and adaptations of the brake light sensing and activation system in accordance with the present invention will suggest themselves to a practitioner of the sensing, and/or the lighting and/or the vehicular safety arts.

In accordance with these and other possible variations and adaptations of the present invention, the scope of the invention should be determined in accordance with the following claims, only, and not solely in accordance with that embodiment within which the invention has been taught.

What is claimed is:

1. For use with a subject vehicle having both brakes and brake lights, a method of activating the brake lights of the subject vehicle comprising:

first sensing any application of the brakes of the subject vehicle;

second sensing any presence of brake light emissions of another vehicle to the forward of the subject vehicle; and always activating the brake lights of the subject vehicle during the persistence of either an application of the brakes of the subject vehicle as is determined by the first sensing, or during brake light emissions of another vehicle as is determined by the second sensing regardless of any of (1) acceleration or de-acceleration or speed of the subject vehicle, (2) proximity of the vehicle to the forward, or (3) status of any airbag or anti-lock braking system of the subject vehicle.

2. The method of activating the brake lights of the subject vehicle according to claim 1 wherein the second sensing comprises:

imaging with a color camera a multi-color image to the forward of the subject vehicle;

storing in a memory the multi-color image; and interpreting with a microprocessor a current multicolored image resulting from the imaging with a historical multicolored image resulting from the storing in order to recognize changes in the image indicative of the activation of one or more brake lights to the forward of the subject vehicle.

3. The method of activating the brake lights of the subject vehicle according to claim 2 wherein the interpreting with the microprocessor, and the comparison of the current image with the stored image, serves to detect any significant incipient increase in a red color, accompanied by only insignificant changes in green and in blue colors, of pixels that are (I) of proper individual areas (ii) at a proper two locations (iii) properly spaced apart in separation and (iv) properly in a substantially horizontal direction so as to reasonably represent light emission from an activated pair of brake lights to the forward of the subject vehicle, to so be an activation of a pair of brake lights to the forward of the subject vehicle.

4. The method of activating the brake lights of the subject vehicle according to claim 3 wherein the interpreting with the microprocessor is of further of angles that the red color pixels occupy relative to the subject vehicle, thus to further decide whether detected brake lights are in lane to the forward of the subject vehicle or are not in lane but are instead to either side of the subject vehicle.

5. The method of activating the brake lights of the subject vehicle according to claim 2 wherein the interpreting with the microprocessor, and the comparison of the current image with the stored image, transpires by a point accumulation process with positive points, meaning that one or more brake lights is deemed to likely have been detected when sufficient points are accumulated from assessment of at least two of the following factors (1) a significant incipient increase in a red color, accompanied by only insignificant changes in green and in blue colors, (2) one or more individual areas of detected illumination increase as are appropriately sized to be an actual image of one or more real brake lights, (3) one or more individual areas of detected illumination increase as are appropriately located to be an actual image of one or more real brake lights, (4) two individual areas of detected illumination occurring at the same time as would be an actual image of a real pair of brake lights, (5) two individual areas of detected illumination increase as are appropriately spaced apart in separation to be an actual image of a real pair of brake lights, (6) two individual areas of detected illumination increase as are appropriately spaced apart in a substantially horizontal direction so as to be an actual image of a real pair of brake lights, and (7) two individual areas of detected illumination as are approximately of equal intensity as would be an actual image of a real pair of brake lights.

6. The method of activating the brake lights of the subject vehicle according to claim 5 wherein the point accumulation process is further in consideration of the following factor:

(8) an angle or angles at which one or more areas of illumination increase are detected as would be appropriate to a location or locations of illumination increase on an actual image of one or more real brake lights to the forward of the subject vehicle.

7. The method of activating the brake lights of the subject vehicle according to claim 1 further comprising:

alerting a driver of the subject vehicle upon brake light emissions of another vehicle as is determined by the second sensing.

8. The method of activating the brake lights of the subject vehicle according to claim 1 wherein the activating of the brake lights of the subject vehicle during the persistence of brake light emissions of another vehicle as is determined by the second sensing commences after a predetermined time delay from initially so second sensing the brake light emissions of another vehicle.

9. A system for activating the brake lights and/or brakes of a subject vehicle comprising:

a first sensor producing a first signal upon any application of the brakes of the subject vehicle;

a second sensor producing a second signal upon any presence of brake light emissions of another vehicle to the forward of the subject vehicle; and an activator of the brake lights and/or brakes of the subject vehicle during the persistence of either the first signal or the second signal regardless of any of (1) acceleration or de-acceleration or speed of the subject vehicle, (2) proximity of the vehicle to the forward, or (3) status of any airbag or anti-lock braking system of the subject vehicle.

10. The system according to claim 9 wherein the second sensor comprises:

a color camera imaging a multi-color image to the forward of the subject vehicle;

a memory storing the multi-color image; and a microprocessor interpreting a current multicolored image resulting from the imaging with a historical multicolored image resulting from the storing in order to recognize the activation of 20 one or more brake lights to the forward of the subject vehicle.

11. The system according to claim 10 wherein the color camera comprises:

a CCD.

12. The system according to claim 10 wherein the color camera comprises:

two spaced apart CCDs;

wherein differing angles to each CCD of a red light to the forward of the subject vehicle is indicative of the distance of the red light.

13. The system according to claim 9 wherein the second sensor comprises:

a red light optical signal sensor producing a red light signal responsive to intensity of red light to the forward of the subject vehicle;

an ambient light sensor producing an ambient light signal response to intensity of ambient light to the forward of the subject vehicle; and a threshold difference detector, receiving the red light signal and the ambient light signal, for producing the second signal upon, and for the duration of, such times as a magnitude of the red light signal is greater than a predetermined ratio to a magnitude of the ambient light signal.

14. The system according to claim 13 wherein the predetermined ratio of the threshold difference detector is adjustable.

15. The system according to claim 9 wherein the second sensor is producing a pulsed second signal; and
wherein upon such times as only the pulsed second signal is being produced, the activator produces flashing brake lights in the subject vehicle.

16. The system according to claim 15 further comprising:
a means for setting the rate at which the pulsed second signal is produced.

17. The system according to claim 16 wherein the means for setting the rate comprises:
a proximity sensor for sensing an obstacle including another vehicle including a vehicle producing the brake light emissions to the forward of the subject vehicle; and
a rate-adjusting means responsive to the proximity sensor for setting a higher rate when the proximity sensor indicates an obstacle relatively closer to the forward and a lower rate when the proximity sensor indicates an obstacle relatively further to the forward.

18. The system according to claim 9 wherein coaction between the activator of the brake lights and/or brakes of the subject vehicle during the persistence of the second signal, and the second sensor producing a second signal upon any presence of brake light emissions of another vehicle to the forward of the subject vehicle, makes that activating of the brake lights and/or brakes of the subject vehicle occurs only after a predetermined delay, it being of no consequence whether this predetermined delay is considered to be in the production of the second signal by the second sensor, or in the activator responsively to this second signal, or in both the second sensor and the activator.

19. The system according to claim 9 further comprising:
an alarm, responsive to the second signal, for alerting a driver of the subject vehicle to any presence of brake light emissions of another vehicle to the forward of the subject vehicle.

20. A system for propagating brake lights between vehicles upon a highway comprising:
a sensor in a vehicle for sensing any application of brake lights to the forward of the vehicle; and
an activator always activating the brake lights of the vehicle responsive to the sensed application of brake lights to the forward regardless of any of (1) acceleration or de-acceleration or speed of the subject vehicle, (2) proximity of the vehicle to the forward, or (3) status of any airbag or anti-lock braking system of the subject vehicle;
wherein brake lights are always propagated from the forward of the vehicle to the rearward of the same vehicle.

21. The system according to claim 20 wherein the sensor and the activator are present in each of an unbroken succession of vehicles.

22. The system according to claim 20 wherein the sensor comprises:
a color camera imaging a multi-color image to the forward of the vehicle; a memory storing the multi-color image; and
a microprocessor interpreting a current multicolored image resulting from the imaging with a historical multicolored image resulting from the storing in order to recognize the activation of one or more brake lights to the forward of the vehicle.

23. The system according to claim 22 wherein the color camera comprises:
one or more CCDs.

* * * * *